United States Patent
Bucher et al.

(10) Patent No.: US 7,194,922 B2
(45) Date of Patent: Mar. 27, 2007

(54) MODULAR FORCE-MEASURING CELL FOR A WEIGHING SCALE, AND WEIGHING SCALE

(75) Inventors: Cyrill Bucher, Bassersdorf (CH); Urs Loher, Nänikon (CH); Jean-Maurice Tellenbach, Hettlingen (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 10/943,094

(22) Filed: Sep. 17, 2004

(65) Prior Publication Data

US 2005/0081650 A1   Apr. 21, 2005

Related U.S. Application Data

(63) Continuation of application No. PCT/EP03/50049, filed on Mar. 10, 2003.

(30) Foreign Application Priority Data

Mar. 18, 2002   (EP) ................... 02100272

(51) Int. Cl.
G01L 1/04   (2006.01)
(52) U.S. Cl. ............................... 73/862.623
(58) Field of Classification Search ........... 73/862.623; 702/41
See application file for complete search history.

(56) References Cited

U.S. PATENT DOCUMENTS

| | | | |
|---|---|---|---|
| 4,065,715 A * | 12/1977 | Jaffe et al. ................... | 324/678 |
| 4,796,212 A | 1/1989 | Kitagawa | |
| 4,815,547 A * | 3/1989 | Dillon et al. ............ | 177/25.14 |
| 5,756,943 A | 5/1998 | Naito et al. | |
| 5,841,077 A | 11/1998 | Kolaci | |
| 5,929,390 A * | 7/1999 | Naito et al. ................. | 177/211 |

FOREIGN PATENT DOCUMENTS

| | | |
|---|---|---|
| DE | 296 22 189 U1 | 4/1997 |
| DE | 199 39 633 A1 | 2/2001 |

(Continued)

OTHER PUBLICATIONS

U. Tietze, Ch. Schenk, Halbleiterschaltungstechnik, 11th edition, first reprint, Springer Verlag, Berlin 1999, pp. 1242-1243.

(Continued)

*Primary Examiner*—Max Noori
(74) *Attorney, Agent, or Firm*—Buchanan Ingersoll & Rooney PC

(57) ABSTRACT

A modular force-measuring cell is disclosed which includes a force transducer equipped with sensors that measure changes occurring in the state of the force transducer as a result of a force or temperature. The force-measuring cell also includes a memory module for storing compensation data associated with the modular force-measuring cell. The memory module and at least one converter circuit for the conversion of the signals delivered by the sensors are arranged in a circuit module that is mechanically and thermally coupled to the force transducer.

22 Claims, 4 Drawing Sheets

FOREIGN PATENT DOCUMENTS

| | | |
|---|---|---|
| EP | 0 319 176 A2 | 6/1989 |
| EP | 0 511 521 A2 | 4/1992 |
| EP | 0 670 479 A1 | 9/1995 |
| EP | 0 702 220 A2 | 3/1996 |
| EP | 1 069 418 A1 | 1/2001 |
| EP | 1 113 249 A2 | 7/2001 |
| GB | 1 462 808 | 1/1977 |

OTHER PUBLICATIONS

Al Brendel, Overload Protection In Electronic Weighing Systems: Part 5, XP-002138047, Measurement and Control, Vo. 12, Nov. 1979, p. 471.

Copending U.S. Appl. No. 10/943,096 and corresponding EP Search Report PCT/EP 03/50050 dated May 21, 2003.

Copending U.S. Appl. No. 10/943,037 and corresponding EP Search Report PCT/EP 03/50048 dated Jul. 8, 2003.

* cited by examiner

MODULAR FORCE-MEASURING CELL FOR A WEIGHING SCALE, AND WEIGHING SCALE

CROSS REFERENCE TO RELATED APPLICATIONS

This application claims priority under 35 U.S.C. §119 to European Application No. 02100272.0 filed in the EPO on 18 Mar. 2002, and as a continuation application under 35 U.S.C. §120 to PCT/EP03/50049 filed as an International Application on 10 Mar. 2003 designating the U.S., the entire contents of which are hereby incorporated by reference in their entireties.

BACKGROUND

The invention relates to a modular force-measuring cell for a weighing scale and it also relates to a weighing scale with a modular force-measuring cell.

Known force-measuring cells of weighing scales are equipped with a force transducer that is on one side connected to a scale housing serving as support base and on the other side to a weighing pan carrier through which the force to be measured is introduced. Force transducers can be configured in a variety of ways. Widely used are transducer designs with an elastically deformable body as a core element, or with a device that performs a force compensation, in most cases by means of a counterbalancing force which is generated by a current-regulated electromagnet and is acting through a lever mechanism.

To give an example, a force transducer which is described in [1], DE 199 39 633 A1, and which is referred to as "counterforce" or "force receiver" in [2], EP 0 670 479 A1, has an elastically deformable body connecting a housing-connected fixed part of the transducer to a force-application part or, in the case of a weighing scale, to a weighing-load application part. The force transducer has transverse grooves at the transitions between the deformable body and the parts that serve to connect the force transducer to the scale housing and the weighing pan carrier. The transverse grooves serve to mechanically uncouple the deformable body in which the deformations effected by the applied forces are measured by means of sensors, such as by means of strain gauges.

The deformable body can be configured as a parallelogram-shaped measuring element with an arrangement of guide members resembling a parallelogram (see for example [3], EP 0 511 521 A1).

The analog signal representing the measurement is generated by means of strain gauges that can be connected to each other in a bridge circuit. The signal can be digitized in a converter circuit and subsequently put through further processing steps. The principal structure of a bridge circuit with strain gauges is described, e.g., in [4], U. Tietze, Ch. Schenk, Halbleiterschaltungstechnik, 11th edition, first reprint, Springer Verlag, Berlin 1999, pages 1242–1243.

A weighing device with a force transducer, a converter device attached to the force transducer, and with a circuit arrangement is described in EP 0 319 176 A [6]. The force transducer and the aforementioned associated elements are enclosed together in a compact unit. The circuit device communicates through a plug connector with the electronic elements of the weighing device. The circuit device includes a device for producing a digital representation of a force acting on the load receiver, a device applying at least one correction factor to the digital representation, and a device for delivering an output of the digital representation. Thus, the enclosed force transducer can be adjusted as a unit and installed in a weighing device. However, this solution has the disadvantage that the analog and digital signal processing elements are placed in immediate proximity of the force transducer. The temperature effects resulting from the heat dissipation of the circuits can be difficult to manage, which complicates the temperature compensation process. Furthermore, the production of these force transducers is expensive, and in case of a failure the entire unit including the electronic portion has to be replaced.

To support the further processing of the digitized measuring signal, the measuring cell described in [2] has a memory module in which characteristic parameters are stored that are specific to the individual measuring cell and are used for the correction of the measuring signals.

As described in [5], Patent Specification GB 1 462 808, the aforementioned correction applies in particular to errors that are caused by non-linearities, hysteresis phenomena, temperature and creep effects. The calibration- and compensation data required for the correction are determined during production at the factory through specific test and measuring procedures and are stored in the memory module (also see [1]).

In the modular force-measuring cell disclosed in [2], the memory module that serves to store the compensation data is arranged in fixed connection with the force transducer and spatially separated from a local circuit arrangement, so that four components, i.e., the strain gauge bridge, a temperature sensor, the force receiver, and the memory module together form a modular unit. The compensation data and correction factors depend primarily on the measuring signals of the temperature sensor that is likewise permanently attached to the force transducer. Appropriate components and methods for the measurement of temperature are described in [4], pages 1224–1231.

The memory module in the modular force measuring cell described in [2] is connected by means of a flexible flat ribbon cable to a local circuit arrangement that is thermally uncoupled from the force transducer and includes an A/D converter and a processor.

The concept of integrating the aforementioned components in a modular unit leads to a simplification in the servicing of a scale in which the modular unit is used. In case of a malfunction, the modular force-measuring cell can be separated from the local circuit arrangement and replaced. The local circuit arrangement, likewise, can be replaced without the need for a recalibration of the scale which in some cases would require the scale to be returned to the factory.

However, the installation of the memory module on the force transducer with the connection to the local circuit arrangement by way of the flexible flat ribbon cable involves some manufacturing costs. Added to this is the risk that the memory module will have a thermal effect on the force transducer during operation, which has to be taken into account in the compensation procedure.

Associated with a modular design configuration is the desire that after installation of a measuring cell into a scale, the latter is already optimally adjusted. In addition to this desirable trait, there are the constant requirements to increase the precision of the scale, to reduce the measuring errors that need to be corrected, and to achieve an even more accurate adjustment.

SUMMARY

The exemplary embodiments of the present invention are directed to an improved modular force-measuring cell for a scale and to a scale that is suitable for the installation of the modular force-measuring cell.

There is a demand for providing a modular force-measuring cell which can be produced at low cost and can be adjusted more precisely. Furthermore, there is a demand for providing a weighing scale that can be equipped with the improved force-measuring cell.

An exemplary modular force-measuring cell disclosed herein has a force transducer with sensors that measure changes in the state of the force transducer which occur as a result of force or temperature. Also provided is a memory module in which the specific compensation data for the force-measuring cell can be stored. A circuit module containing the memory module as well as at least one converter circuit for the conversion of the analog sensor signals can be mechanically coupled to the force transducer in close spatial proximity to achieve a thermal coupling effect.

If only one converter circuit is provided, it can be used to convert the analog signals of a temperature sensor during time intervals when no force measurements are taking place.

The circuit module can contain only those circuit parts which are sensitive on their own to environmental factors, particularly to temperature, but also to humidity. This includes primarily components associated with the analog signal processing activity that is functionally close to the sensors. The dependence of these components on environmental factors which have an effect on the measuring signals can thus be taken into account together with the environmental dependence of the mechanical parts of the force transducer. The values of the stored compensation parameters will take the temperature-dependent effects on the circuit components into account at the same time. It is possible to arrange additional circuit parts on the module, such as the further, digital components of a converter circuit, but there is no need to do this, as the signals produced by the digital components require no compensation, while their heat dissipation would be a negative factor.

The configuration structure of the modular force-measuring cell according to exemplary embodiments of the invention has a multitude of advantages. The arrangement of the memory module on the circuit module can eliminate the adhesive attachment of the memory module to the force transducer as well as the connection from the memory module to the circuit module. The arrangement can further eliminate the local temperature effect on the force transducer that occurs as a result of the heat dissipation of the memory module.

A more precise adjustment of the modular force measuring cell according to exemplary embodiments of the invention is achieved because:

interference factors such as, e.g., the aforementioned temperature effect of the memory module, can be reduced;
measurement deviations caused by the circuit module for the processing of analog measuring signals can be compensated;
measurement deviations caused by resistance changes in the electrical connections of the strain gauge measuring bridge can be avoided; and
correction factors, i.e., the effective average temperature values of the force transducer, can be measured more precisely.

The thermal coupling between the circuit module and the force transducer due to their close mutual proximity can lead to a temperature equalization between these parts without the undesirable localized heating of the force transducer, so that temperature-compensating measures can correct not only the temperature-related measuring deviations of the force transducer but also of the circuit module that serves for the processing of analog signals, with a single temperature sensor being sufficient to perform the temperature compensation. Exemplary arrangements offer the further principal possibility of using lower-cost components, in particular resistors with a higher temperature coefficient, on the circuit module, which results in cost savings.

After an original or replacement installation of a correctly factory-adjusted modular measuring cell into a measuring system, in particular a scale, the entire measuring system or scale will in each case be in optimal adjustment, because the compensation data stored in the memory module can account for all of the imperfections of the mechanical portion of the transducer such as creep, hysteresis, non-linearity, etc., as well as the environmental effects such as temperature, air pressure, humidity, etc. on the transducer as a whole, inclusive of the circuit module.

The converter circuits can operate according to the counter system described in [4], on page 1056, which can be realized with an inexpensive circuit. The simple circuit configuration has the further advantage of a low level of heat dissipation. In an exemplary arrangement, the converter circuits produce bi-level pulse width-modulated signals that can be entered into a digital signal-processing module. The counter module for the count-based converter circuit can thus be arranged in the processor module, so that the amount of circuitry on the circuit module is further reduced.

In order to avoid undesirable thermal effects, the digital signal-processing modules can to a large extent be thermally uncoupled from the measuring cell. As a result, the circuit module that is coupled to the force transducer will not heat up very much, so that the temperature gradients in the force transducer are kept small.

The circuit module can have a flexible or rigid substrate with conductive tracks, for example a printed circuit board, through which the temperature equalization between the circuit module and the force transducer takes place. An optimal heat transfer combined with a shielding of electromagnetic fields can be assured by a metallic element that is at least partially in surface contact with the substrate of the circuit module and releasably connected, for example screwed together, with the force transducer, where the circuit module can be connected to the metallic element by means of snap-connectors, clamps, screws, or other means.

The deformable body of the force transducer is configured, e.g., as a parallelogram-shaped measuring element with strain gauges arranged in the deformation zones or thinned-down portions. In an exemplary arrangement, the strain gauges are connected by at least two flexible ribbon-type connectors to the circuit module, where they are combined into a bridge circuit. The strain gauges, which can for example consist of piezo-resistive elements, are connected to conductive leads that can be printed on a flexible ribbon and are dimensioned so that all connector leads from the nodal points of the bridge circuit to the terminals of the strain gauges have at least approximately equal resistance values, including cases where a connector lead consists of two or more parts. Temperature-related resistance changes in the connector leads will therefore compensate each other, so that in the absence of a load on the force transducer the bridge circuit remains in balance even after a temperature change has occurred during operation. The conductor tracks that form the connections of the bridge circuit can, in addition, be thermally coupled to the force transducer, so that the resistance changes which occur as a result of temperature shifts are equal in all of the conductor tracks.

Sections of the conductor tracks leading to the strain gauges can be joined in a node of the measuring bridge circuit already before the connection to the circuit module, so that the required number of connector tabs on the circuit module is reduced.

The circuit module can be attached to the part of the force transducer that is mounted in a fixed position in the housing. This can cause a longitudinal temperature gradient in the force transducer when the scale is in operation. As an exemplary optimal way of determining the temperature that is relevant for the behavior of the force transducer,. it can be advantageous to arrange a temperature sensor at a location where the temperature level represents an average of the temperatures at the sensors in the measuring bridge circuit. In the foregoing example where the deformable body is parallelogram-shaped, the temperature sensor can be arranged at the midpoint of one of the horizontal members of the parallelogram.

BRIEF DESCRIPTION OF THE DRAWINGS

In the following, exemplary embodiments of the invention will be explained in more detail with reference to drawings of an example of a force-measuring cell with a deformable body configured as a parallelogram-shaped measuring element with strain gauges used as sensors. However, the example presented is not meant to impose limitations on the scope of the invention. The invention can also be used with other types of force-measuring cells. In the drawings.

DETAILED DESCRIPTION

Figure 1:
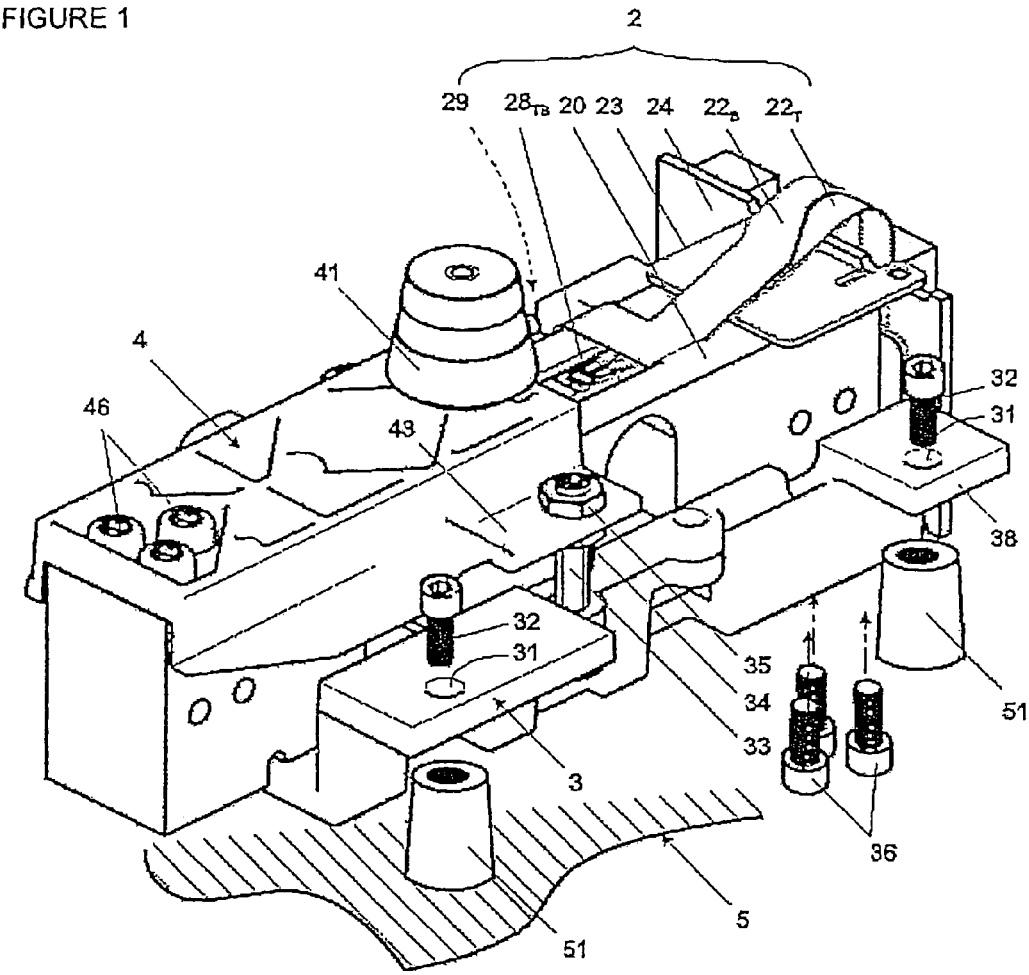
FIG. 1 illustrates an exemplary modular force-measuring cell 2, which includes a force transducer 20 with sensors 28, 29 and a circuit module 24, and which has screw connections to a fastening part 3 and a weighing pan carrier 4.
Figure 2:
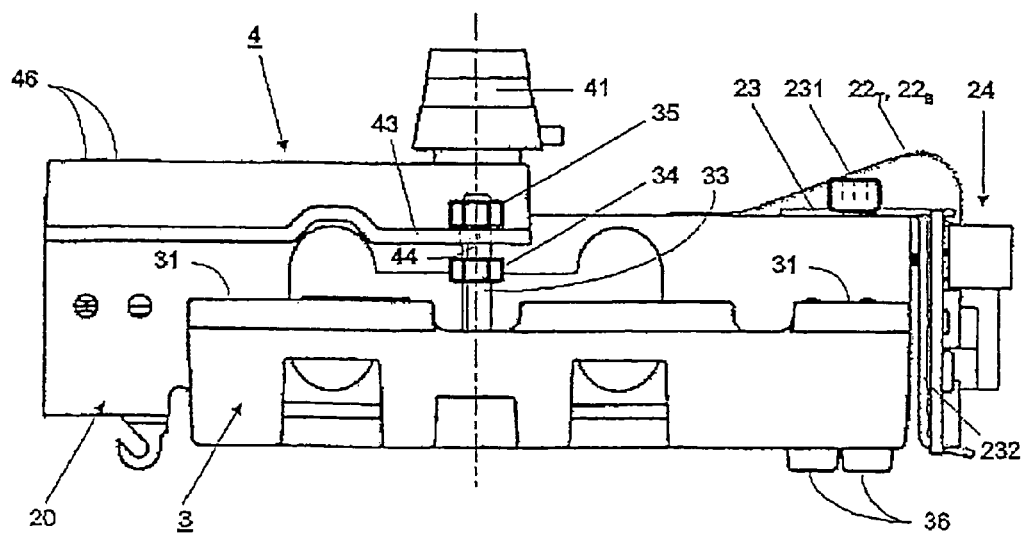
FIG. 2 shows a side view of the exemplary modular force-measuring cell 2 of FIG. 1.
Figure 5:
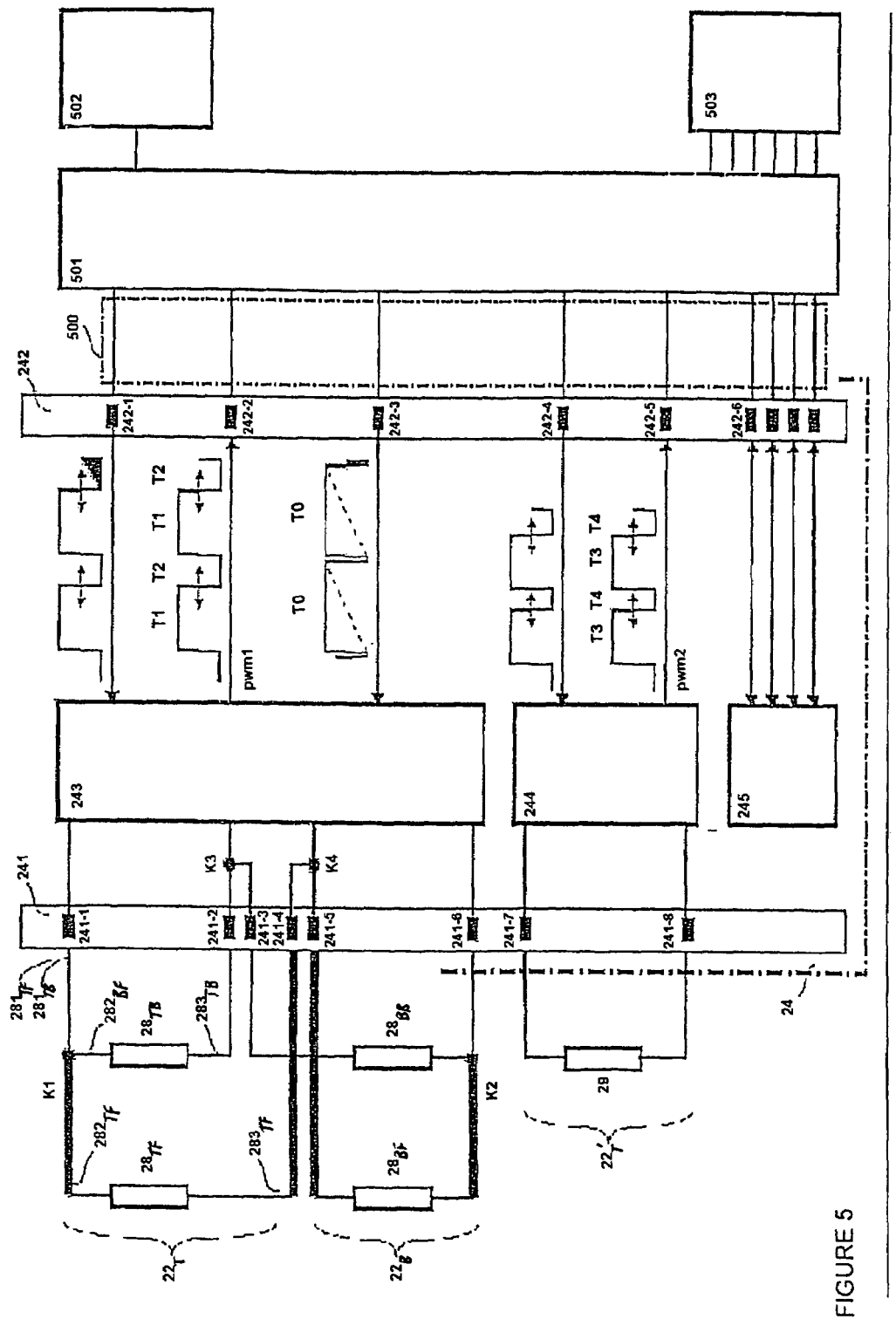
FIG. 5 shows the modular structure of an exemplary circuit module 24 that communicates with the sensors 28, 29 through the ribbon connectors $22_T$, $22_T'$, $22_B$ and with a processor module 501 through the further ribbon connector 500.

FIGS. 1 and 2 illustrate a modular force-measuring cell 2 according to an exemplary embodiment of the invention, which is connected to a weighing pan carrier 4 and a fastening part 3 by means of screws 36 and 46, respectively, and which includes a force transducer 20 with sensors 28, 29 and a circuit module 24 carrying a memory module 245 for the storage of compensation data and at least one circuit arrangement 243, 244 for the conversion of analog measuring signals (also see FIG. 5).

Figure 3:
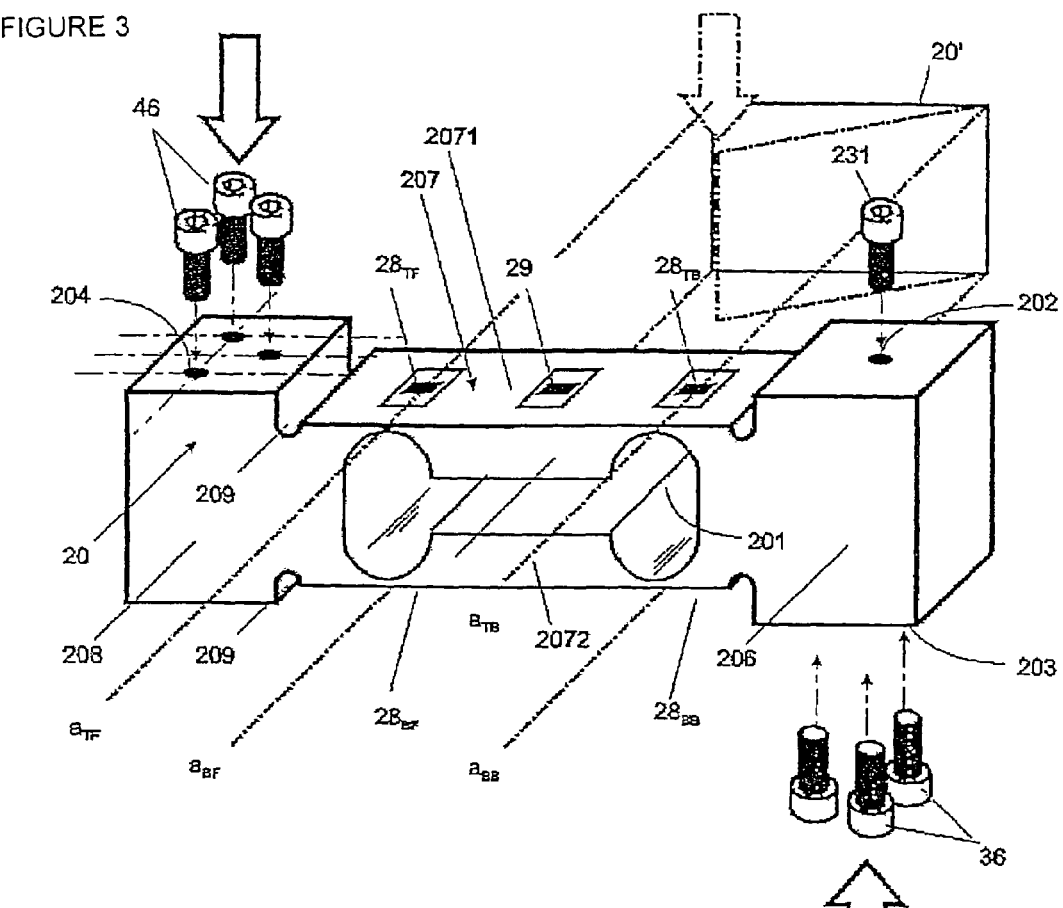
FIG. 3 illustrates an exemplary force transducer 20 of the modular force-measuring cell 2 of FIG. 1 with the screws 36, 46, 231 that serve, respectively, to attach the fastening part 3 which can in turn be connected to a scale housing 5, to attach the weighing pan carrier 4, and to attach a metal element 23 serving to hold the circuit module 24.

The force transducer 20 that is shown in an exemplary embodiment in FIG. 3 has a deformable body 207 designed as a parallelogram-shaped measuring element (see FIG. 3, element 20') with horizontal members 2071, 2072 that are pivotally guided in the manner of a parallelogram linkage. The deformable body 207 connects a housing-mounted fixed part 206 of the force transducer 207 to the force-introduction part, in this case the load-receiving part 208. To uncouple the stress field of the deformable body 207, the force transducer has transverse grooves 209 at the borders to the parts 208 and 206 that serve for the connection to the fastening part 3 and to the weighing pan carrier 4. At the corners of the virtual parallelogram linkage formed by the measuring element, the deformable body 207 has thin material portions where strain gauges $28_{TF}$, $28_{TB}$, $28_{BF}$, $28_{BB}$ are installed. The locations of maximum bending deformation at the thin material portions are indicated by the bending axes $a_{TF}$, $a_{TB}$, $a_{BF}$, $a_{BB}$ that extend perpendicular to the plane of the parallelogram.

In addition, a temperature sensor 29 that is used for temperature compensation is arranged at the midpoint of the upper horizontal member 2071 of the deformable body 207. As the illustrated arrangement is characterized by a temperature gradient in the longitudinal direction, the temperature measured by the sensor 29 represents an average value of the temperatures occurring within the deformable body 207. Based on this average value, the measurement deviations caused by temperature changes can be corrected more precisely.

The strain gauges $28_{TF}$, $28_{TB}$, $28_{BF}$, $28_{BB}$ are connected to the circuit module 24 by means of two separate flexible ribbon-type connecting elements $22_T$, $22_B$, such as foil strips with printed conductor tracks. An angular metal element 23, connected to the force transducer 20 by means of a screw 231, holds the circuit module 24 in a way that promotes the heat exchange between the circuit module 24 and the force transducer 20. To perform this heat-exchange function, the metal element 23 has a plate-shaped part 232 that lies against the circuit module 24, the latter being, e.g., a circuit board with circuit components.

Figure 4:
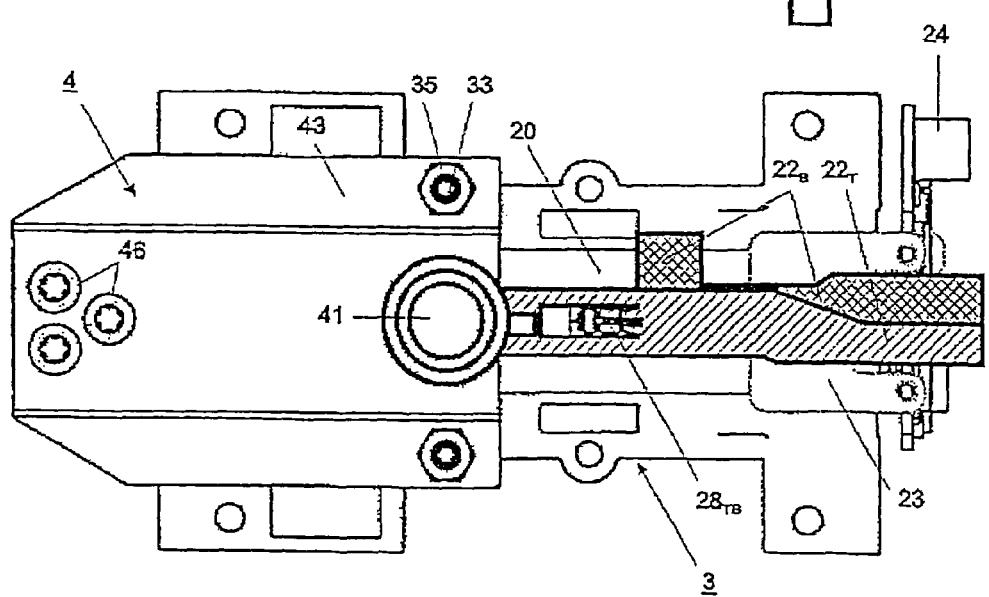
FIG. 4 illustrates the exemplary modular force-measuring cell 2 as seen from above with two ribbon connectors $22_T$, $22_B$, through which the circuit module 24 is connected to the sensors 28, 29.

An exemplary configuration of the two flexible ribbon-type connections $22_T$, $22_B$ (see FIG. 4), which connect the circuit module 24 to the respective strain gauge pairs $28_{TF}$, $28_{TB}$ on the top surface and $28_{BF}$, $28_{BB}$ on the bottom surface of the deformable body, will be discussed below.

Exemplary advantages of the exemplary modular force-measuring cell 2 have been described above. In contrast to the solution proposed in reference [2], the memory module 245 (see FIG. 5) can be placed directly on the circuit module 24, which can eliminate the direct attachment of the memory module to the force transducer as well as the additional electrical connecting element required for the memory module. As will be described in detail below, the thermal coupling between the circuit module 24 and the force transducer 20 can allow the combined measurement deviations caused by the force transducer 20 and the circuit module 24 to be compensated on the basis of a single temperature measurement. Thus, after adjustment at the factory, the modular force-measuring cell 2 can be installed in new production scales or in an existing scale at a user location to replace a defective measuring cell without the need for making further adjustments in the scale. Since the measurement deviations caused by the circuit module 24 are included in the compensation, the scale can, in either case, have an optimal degree of precision.

FIG. 5 represents an exemplary embodiment of the modular structure of a circuit module 24 that is connected to the strain gauges $28_{TF}$, $28_{TB}$, $28_{BF}$, $28_{BB}$ and a temperature sensor 29 through the terminal strip 241 and ribbon connectors $22_T$, $22_T'$, $22_B$ and to a processor module 501 through the terminal strip 242 and a further ribbon connector 500. The processor module, in turn, is connected to a display 502 and an interface module 503. The processor module 501 is arranged inside the scale with a separation from the circuit module 24, so as to avoid thermal coupling between the two modules. Thus, the heat generated by the processor module 501 has no appreciable influence on the modular force-measuring cell 2.

The circuit module 24 includes two converter circuits 243, 244. The first converter circuit 243 converts the analog signals of the strain gauge bridge circuit $28_{TF}$, $28_{TB}$, $28_{BF}$, $28_{BB}$ into bi-level, pulse-width modulated signals pwm1, while the second converter circuit 244 converts the analog signals of the temperature sensor 29 into bi-level, pulse-width modulated signals pwm2. The signals pwm1, pwm2 are sent through the ribbon connector 500 to the processor module 501, where the signals are further processed. After switching the scale on or at any desired time, the pertinent compensation data can be recalled from a memory module 245, so that subsequent measurement deviations can be corrected.

FIG. 5 further illustrates an exemplary embodiment of the flexible, ribbon-type connections $22_T$, $22_B$, which serve to connect the circuit module 24 to the respective strain-gauge pairs $28_{TF}$, $28_{TB}$ and $28_{BF}$, $28_{BB}$, which are arranged at the top and bottom of the deformable body 207 and connected to each other in a bridge circuit.

The dimensions of the conductor tracks, which are printed on a flexible ribbon connector $22_T$, $22_B$ and which may be divided into sections $281_{TF}$, $282_{TF}$, $283_{TF}$; $281_{TB}$, $282_{TB}$, $283_{TB}$; . . . are selected so that all of the connecting leads from the nodes of the measuring bridge circuit to the terminals of the strain gauges $28_{TF}$, $28_{TB}$, $28_{BF}$, $28_{BB}$ have at least approximately equal resistance values.

The equalization of the resistance values can be important, because the strain gauges $28_{TF}$, $28_{BF}$ are located farther away from the circuit module 24 and therefore can possess longer connecting leads than the strain gauges $28_{BF}$, $28_{BB}$. As a compensation measure to avoid an increase in resistance due to the greater length, the longer leads can be configured with a commensurately larger cross-sectional area. As a result, resistance changes in the connecting leads of the bridge circuit will compensate each other, so that in the absence of changes in the applied load, the equilibrium or bias of the bridge circuit will remain unchanged during temperature changes of any magnitude that may occur during operation.

In the circuit layout shown in FIG. 5, each of the flexible ribbon connectors $22_T$, $22_B$ has a respective nodal point K1, K2 where two of the printed circuit tracks are joined into a single track, so that the number of connector terminals on the circuit module 24 is reduced from eight to six terminals 241-1, 241-2, 241-3, 241-4, 241-5, 241-6. As a way of keeping the arrangement simple, two completely separate flexible ribbon connectors $22_T$, $22_B$ can be used, where on each of the two ribbons two lead tracks are routed through separate connector terminals, i.e., 241-2, 241-3, 241-4, 241-5, to the circuit module 24 where they are joined in the respective nodes K3 and K4.

Figure 6:
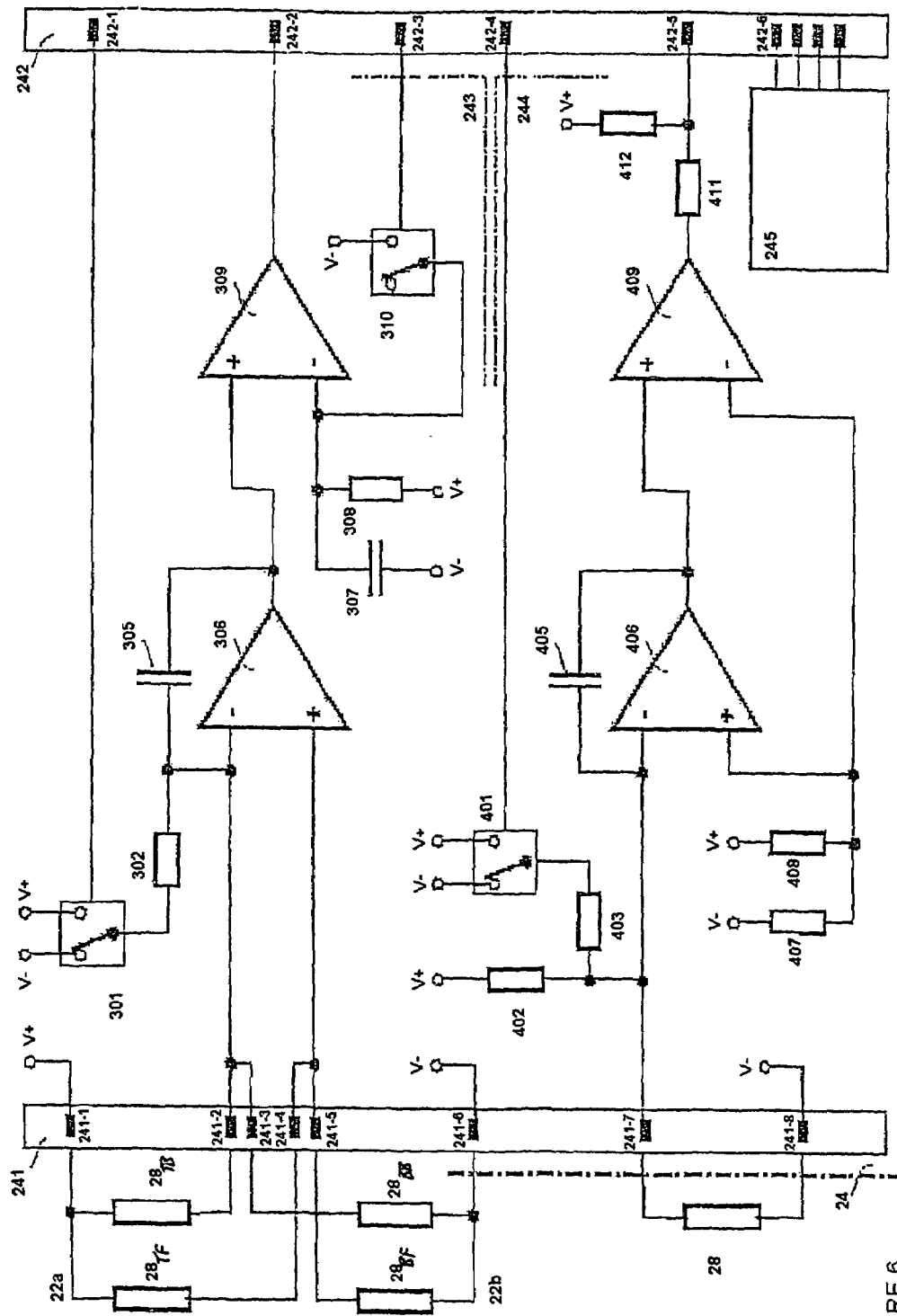
FIG. 6 illustrates exemplary configurations of converter circuits 243, 244 that serve to convert analog sensor signals and are arranged on the circuit module 24.

FIG. 6 illustrates exemplary configurations of converter circuits 243, 244 for the conversion of analog sensor signals, which are arranged on the circuit module 24 and whose working principle is based on the counting process for which a description is found in [4], pages 1056–1062.

In each of the converter circuits 243, 244, the respective switch 301, 401 is alternated between the positions V− and V+, so that the charge that is built up in the respective capacitor 305, 405 during a first time segment is balanced with the charge that is drained from the capacitor in a second time segment (charge balancing process). Of course, the inflow and outflow of charge can depend on the input signal, i.e., on the quantity being measured, so that the respective time segments for the charge and discharge of the capacitor 305, 405 vary accordingly. If the capacitor 305, 405 is charged up by the input signal during a first time segment, the length of the time segment in which the capacitor is subsequently discharged represents a measure for the magnitude of the input signal. Thus, the resultant pulse-width modulated signal can be sent to a counting circuit that is preferably integrated in the processor module 501.

Consequently, the converter circuits 243 and 244 can be designed with a small number of components. The respective input signals are fed to the operational amplifiers 306, 406 which are set up as integrators by means of the capacitors 305 and 405, respectively, with comparators 309 and 409 following downstream in the circuit.

In the comparator 309 of the first converter circuit 243, the output signal of the operational amplifier 305 is compared to a voltage with an approximately ramp-shaped time profile, which is generated by means of a capacitor 307, a resistor 308, and a switch 310 that is periodically opened and closed. Thus, in the first converter circuit 243, the output signal of the operational amplifier 305 takes on a value that corresponds to the input signal, i.e., to the force that is acting on the force transducer 20.

In contrast to the first converter circuit 243, the comparator 409 of the second converter circuit 244 compares the output signal of the operational amplifier 406 to a constant voltage that is formed by means of a voltage divider 407, 408. In accordance with the polarity of the input signal, the output voltage of the operational amplifier 406 follows an upward ramp function during a first time interval until it reaches the voltage level set by the voltage divider 407, 408, at which point the switch 401 is flipped over and the output voltage returns along a downward ramp. Consequently, the switch-over time provides a measure for the magnitude of the input signal and thus for the temperature measured by the sensor 29. The working principle of the second converter circuit 244 is similar to the dual-slope method described in reference [4] on page 1059. Of course, there are a variety of different methods and circuit arrangements that can be used for the same purpose.

As FIG. 6 illustrates, the converter circuits 243, 244 can be of a simple configuration, so that the heat dissipation effect on the force transducer 20 from the components of the circuit module 24 is relatively small.

According to an exemplary way of installing a modular measuring cell 2 in a weighing scale, which is shown in FIG. 1, the housing-mounted fixed part 206 of the force transducer 20 is fastened by means of screws 36 to a U-profiled fastening part 3 with wing portions 38. The wing portions 38 of the fastening part 3 have passage holes 31 for screws 32 that serve to mount the fastening part 3 on support elements 51 which are provided for this purpose in the scale housing 5 and are equipped with threaded inserts. The support elements 51 can be made of an insulating material, so that the measuring cell 2 is thermally uncoupled from the scale housing 5 and from other modules that are arranged in the scale housing, for example the processor module 51.

A weighing-pan carrier 4 with a conical seating peg 41 for the weighing pan is connected to the force-application part or load-receiving part 208 of the force transducer 20 by means of screws 46.

Further, as shown in FIG. 2, a threaded bolt 33 that is connected to the fastening part 3 passes through a hole 44 in a lateral part 43 of the weighing pan carrier 4. The bolt 33 is equipped with two threaded nuts 34, 35 which can, for example, be adjustable to delimit the movement range of the weighing pan carrier 4, specifically its lateral part 43, in the up- and down directions to prevent overloading due to a pulling or pushing force on the modular measuring cell.

The disclosures of documents [1]–[5] referenced herein, are hereby incorporated by reference in their entireties.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

The invention claimed is:

1. A modular force-measuring cell comprising:
   a force transducer equipped with sensors that measure changes of the force transducer as a result of a force or temperature;
   a memory module for storing compensation data associated with the modular force-measuring cell; and
   a circuit module mechanically and thermally coupled to the force transducer, wherein said circuit module comprises the memory module, at least one converter circuit for converting analog signals delivered by the sensors, and a connector terminal arrangement through which the memory module and the converter circuit each are connectable separately to a processor module, wherein the processor module is spatially set apart from the force-measuring cell to provide a thermal uncoupling between the processor module and the force measuring cell.

2. The modular force-measuring cell according to claim 1, wherein in addition to the memory module, the circuit module comprises substantially only circuit components associated with analog signal processing activity that is functionally close to the sensors.

3. The modular force-measuring cell according to claim 1, comprising:
   two converter circuits for generating digital signals corresponding to analog signals delivered by the sensors representing, respectively, an applied force and a temperature of the force transducer.

4. The modular force-measuring cell according to claim 1, wherein the circuit module is connected by a ribbon connector to the processor module, said processor module being operable to read the compensation data from the memory module and to perform processing of the digital signals delivered by the at least one converter circuit.

5. The modular force-measuring cell according to claim 1, wherein the circuit module comprises a substrate with conductive tracks.

6. The modular force-measuring cell according to claim 1, comprising:
   a metal element which is at least partially in surface contact with a substrate of the circuit module and releasably connected to the force transducer, wherein the circuit module is configured to be connected to the metal element.

7. The modular force-measuring cell according to claim 1, wherein the force transducer comprises a deformable body which can be configured as a parallelogram-shaped measuring element with elastically deformable material portions carrying at least one sensor, connected by means of at least one flexible ribbon connector to the circuit module.

8. The modular force-measuring cell according to claim 7, wherein a conductive track of the flexible ribbon connector which leads to the sensor is printed on a flexible ribbon or foil material.

9. The modular force-measuring cell according to claim 7, wherein the deformable body carries four sensors connected to form a measuring bridge circuit.

10. The modular force-measuring cell according to claim 9, wherein the sensors are strain gauges.

11. The modular force-measuring cell according to claim 9, wherein conductive tracks leading to each of the sensors are printed on a flexible ribbon or foil material, and are dimensioned so that connector leads to terminals of the sensors have at least approximately equal resistance values, including cases where a connector lead consists of two or more sections.

12. The modular force-measuring cell according to claim 9, wherein the sensors are connected to the circuit module by means of at least two separately routed flexible ribbon connectors.

13. The modular force-measuring cell according to claim 11, wherein the conductive tracks leading to the sensors have partial sections that are used in common by two or more of the sensors for reducing a number of connector terminals on the circuit module.

14. The modular force-measuring cell according to claim 9, comprising:
   a temperature-probing sensor arranged at a location where a temperature level represents an average of temperatures at the sensors of the measuring bridge circuit.

15. The modular force-measuring cell according to claim 3, wherein the digital signals are pulse-width modulated signals.

16. The modular force-measuring cell according to claim 1, in combination with a weighing scale.

17. The modular force-measuring cell according to claim 3, wherein the circuit module is connected by a ribbon connector to the processor module, said processor module being operable to read the compensation data from the memory module and to perform processing of the digital signals delivered by at least one of the two converter circuits.

18. The modular force-measuring cell according to claim 17, comprising:
   a metal element which is at least partially in surface contact with a substrate of the circuit module and releasably connected to the force transducer, wherein the circuit module is configured to be connected to the metal element.

19. The modular force-measuring cell according to claim 18, wherein the force transducer comprises a deformable body which can be configured as a parallelogram-shaped measuring element with elastically deformable material portions carrying at least one sensor, connected by means of at least one flexible ribbon connector to the circuit module.

20. The modular force-measuring cell according to claim 19, wherein a conductive track of the flexible ribbon connector which leads to the sensor is printed on a flexible ribbon or foil material.

21. The modular force-measuring cell according to claim 20, comprising:
a temperature-probing sensor arranged at a location where a temperature level represents an average of temperatures at the sensors of the measuring bridge circuit.

22. A modular force-measuring cell comprising:
a force transducer equipped with sensors that measure changes of the force transducer as a result of a force or temperature;
a memory module for storing compensation data associated with the modular force-measuring cell; and
a circuit module mechanically and thermally coupled to the force transducer, wherein said circuit module comprises the memory module, at least one converter circuit for converting analog signals delivered by the sensors, and a connector terminal arrangement which connects the memory module and the converter circuit to a processor module, wherein the processor module is thermally uncoupled from the circuit module.

* * * * *